(12) United States Patent
Taylor, II et al.

(10) Patent No.: US 11,788,037 B2
(45) Date of Patent: Oct. 17, 2023

(54) PROCESS FOR TREATING WORT

(71) Applicant: Coors Brewing Company, Denver, CO (US)

(72) Inventors: Robert Taylor, II, Denver, CO (US);
Josh Gwirtz, Milwaukee, MI (US);
Peter Reilly, Milwaukee, MI (US);
Tanya Hulse, Milwaukee, MI (US); Gil Alberding, Milwaukee, MI (US);
Martin Brooks, Milwaukee, MI (US)

( * ) Notice: Subject to any disclaimer, the term of this patent is extended or adjusted under 35 U.S.C. 154(b) by 1024 days.

(21) Appl. No.: 16/460,039

(22) Filed: Jul. 2, 2019

(65) Prior Publication Data

US 2021/0002593 A1    Jan. 7, 2021

(51) Int. Cl.
| C12C 7/20 | (2006.01) |
| C12C 11/00 | (2006.01) |
| C12C 7/00 | (2006.01) |

(52) U.S. Cl.
CPC ............. C12C 11/003 (2013.01); C12C 7/00 (2013.01)

(58) Field of Classification Search
CPC .................................. C12C 7/00; C12C 7/22
USPC ............. 426/11, 13, 16, 29, 330.4, 520, 592
See application file for complete search history.

(56) References Cited

U.S. PATENT DOCUMENTS

2016/0251604 A1*  9/2016  De Schutter ............ C12C 13/08
                                                                   426/16

FOREIGN PATENT DOCUMENTS

| DE | 2245435 | 3/1974 |
| DE | 102008033287 | 1/2010 |
| DE | 10-2011-081648 | 2/2013 |
| EP | 1420064 | 5/2004 |
| EP | 2871227 | 5/2015 |
| ZA | 1997/08962 | 6/1998 |

OTHER PUBLICATIONS

Official Action for Canada Patent Application No. 30483002, dated May 16, 2022, 4 pages.
Extended European Search Report for Europe Patent Application No. 19183785.5, dated Jan. 7, 2020, 6 pages.
Notice of Allowance for Canada Patent Application No. 30483002, dated Oct. 17, 2022, 1 page.

* cited by examiner

*Primary Examiner* — Vera Stulii
(74) *Attorney, Agent, or Firm* — Sheridan Ross P.C.

(57) ABSTRACT

The present invention provides a process for treating a wort composition in a kettle, said method providing a significant energy saving compared to existing wort treatment processes. In particular, the process includes a hot-hold step for the wort, followed by gas sparging at elevated temperatures.

20 Claims, 4 Drawing Sheets

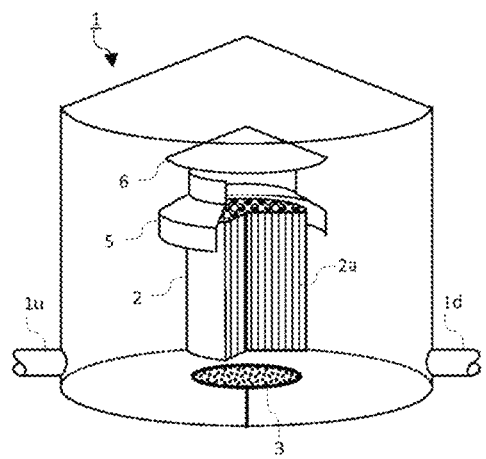
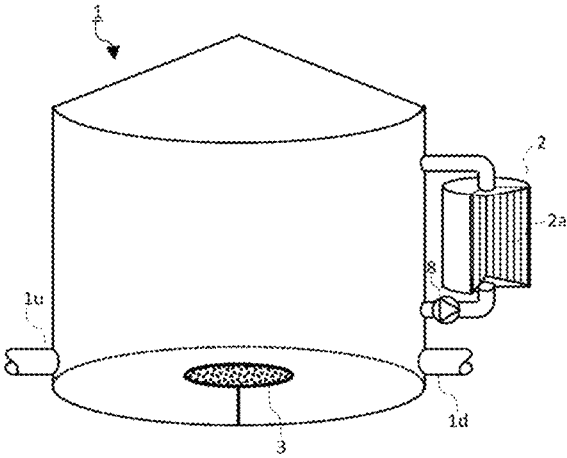
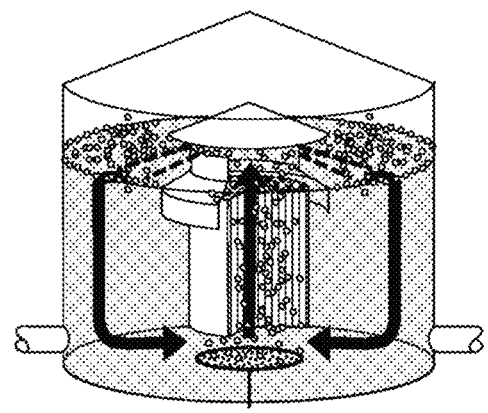
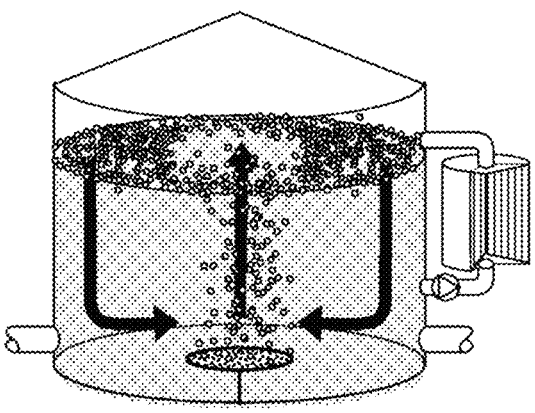
(a)      (a)
(b)      (b)
FIG.3      FIG.4

(a)

(b)

PROCESS FOR TREATING WORT

TECHNICAL FIELD

The present invention relates to an improvement of conventional wort boiling techniques in beer brewing processes. In particular it concerns such process which is substantially more economical in terms of energy consumption than hitherto achieved.

BACKGROUND FOR THE INVENTION

Brewing a beer or a malt based beverage comprises feeding malt to a grinder which is then mixed with water and mashed at a moderately high temperature to promote enzymatic conversion of starches into fermentable sugars. In the lautering or mash press step, the mash is separated into the clear liquid wort and the residual grain. The thus separated wort is then fed to a kettle, in a step traditionally referred to as "boiling" step because the wort is conventionally heated above its boiling temperature to sterilize it, terminate enzymatic activity, develop favourable flavour characteristics, and convert and/or remove undesired components. After the boiling step, trub which has formed during the boiling step is separated from the wort usually in a whirlpool tun, as for example disclosed in DE10 2008 033 287. Wort is then cooled, fermented, matured, filtered and packaged, e.g., in bottles, kegs, cans, and the like.

Breweries face challenges including the ever-increasing energy prices and complicated transportation due to exportation. The increased exportation forces the breweries to search for technological changes that improve the colloidal, microbial and flavour stability. Flavour stability is today not yet fully understood. It is known, however, that the wort boiling process has a major impact on beer flavour stability.

Wort boiling is one of the most energy-consuming process steps in the brewery. Traditionally, the boiling of wort aimed to achieve multiple objectives. As the understanding of the biochemical and physical processes has improved, it has been possible to separate the requirements for each objective and re-visit how these could be achieved in a less energy-intensive process. Traditionally, wort boiling serves the following functions:
  (a) Wort sterilization,
  (b) Termination of enzymatic activity,
  (c) Isomerization of alpha acids into iso-alpha acids,
  (d) Coagulation of proteins and polyphenols,
  (e) Breakdown of S-methylmethionine (SMM) into dimethylsulfide (DMS),
  (f) Removal of unwanted flavor compounds,
  (g) Flavour formation.

Wort sterilization and termination of enzymatic activity are easily achieved when reaching temperatures of more than 90° C. The isomerization rate of hop acids is temperature dependent, roughly doubling every 10° C. Denaturation of enzymes and haze-active proteins with subsequent coagulation and precipitation with polyphenols must be completed during the wort boiling process. The coagulation process is dramatically enhanced when the interface between liquid and gas is enlarged. When wort reaches the boiling temperature, vapour bubbles provide this extra interface. Flavour Formation, requires heat and time and is assisted by effective mixing. Removal of unwanted flavour compounds requires mass transfer of the targeted compounds from the wort into an alternative medium in a separation process. Given the volatility of these components one method of separation is to strip them off using a carrier gas. In standard boiling technologies the 'carrier gas' is in fact water vapour from the boiling process itself.

Breakdown of S-methylmethionine (SMM) to dimethylsulfide (DMS) which is very volatile is a necessary step prior to the evacuation of DMS. The most energy-requiring objective is the removal of unwanted flavour compounds, in particular DMS, but also other flavour compounds. Every volatile is determined by the vapour-liquid-equilibrium (VLE) of the component and wort, the latter being considered physically similar to pure water. This means that a predetermined amount of evaporation is needed to reduce the level of an undesired compound to sub-threshold levels. There is therefore always a minimum evaporation required and most recent systems operate with a minimum of 4-6 wt. % evaporation during the boiling process.

Increasingly it has become clear that boiling has been a 'means to an end', rather than the end in itself, of achieving a stabilised, (typically) hopped wort ready for further processing before cooling into a fermentation vessel. The most critical of these, in terms of the demands placed on the technology selection, are to ensure the formation of key flavour compounds (an example being formation of DMS from SMM), and the removal of an appropriate proportion of volatile compounds (e.g. DMS) to ensure suitable downstream processing and ultimately the desired organoleptic properties of the final beer.

Several wort boiling techniques are known in the art. For example, since the 1970's, a commonly applied boiling method is boiling with natural convection by means of an internal boiler. The internal boiler is cylindrically shaped formed by a bundle of hollow heated tubes, and wort can freely flow through these tubes. The working principle is of the 'thermosyphon' type, whereby wort enters the heating tubes, reaches boiling temperature and vapour bubbles will form and arise. These vapour bubbles (very low density) are the driving force upward through the internal boiler, thereby ensuring a natural convection. Alternatively, the boiler can be located outside the kettle and wort is fed therethrough by means of a pump and returned into the kettle. In the last decade numerous new and innovative boiling systems have been introduced. They all focus on energy reduction by decreased evaporation and by reduction of thermal load measured on wort by the thiobarbituric acid (TBA) number method. Examples of modern wort boiling systems are based on: dynamic wort boiling; thin-film evaporation; external thermosyphon boiler with increased heating surface; continuous wort boiling; vacuum boiling, internal boiler with forced convection; gentle boiling with flash evaporation; and wort boiling with inert gas sparging. In particular, wort boiling with inert gas sparging consists of boiling wort for a duration of about 30 min at which point, while still boiling, an inert gas is sparged into the boiling wort, which considerably enhances the removal rate of DMS. The sparging is provided by a ring-structure located at the bottom of the wort kettle, such as disclosed in EP875560. Owing to the facilitated DMS removal, the boiling time can be shortened and evaporation rates could be reduced to about 4 wt. %.

The applicant has used gas sparging of wort since 2002. The successful results led to commercial-scale implementation using brewery $CO_2$ as the stripping gas. It was then discovered that compressed air achieved the same results at a lower cost than $CO_2$, with no negative impact on key wort or product quality parameters such as T150 or TBA, provided the air sparging only commenced once the wort was at boiling temperature—the solubility of oxygen being negligible or even non-existent under these conditions. This allowed the applicant to reduce total evaporation from approximately 7% to a maximum of 5%. This concept has now been termed 'Sparge-Assisted Boiling'.

Even with the latest wort boiling techniques, wort boiling remains the most energy-consuming step of the whole brewing process. There therefore remains in the art a clear need for a more economical treating process of wort issued from a lauter tun. The present invention proposes such process. This and other advantages are presented in the next sections.

SUMMARY OF THE INVENTION

The present invention concerns a process for treating a wort composition in a kettle, said method comprising the steps of:

(a) providing:
a kettle provided with an inlet suitable for feeding a wort composition into the kettle and with an outlet suitable for flowing the wort out of the kettle; heating means;
a gas sparging system suitable for sparging a gas into said wort;

(b) adding wort from a mash separating step into said kettle through the inlet;

(c) heating said wort to a target temperature between 80 and 96° C.;

(d) maintain an average target temperature between 80 and 96° C. for a period of 12-45 minutes, and during which the wort composition does not reach its boiling point, and during which period gas sparging of less than 10 g/Hl/Hr, preferably no gas sparging, takes place;

(e) raising the temperature of the wort composition to a target temperature of between 97° C. and 99° C.;

(f) sparging a gas through the wort composition at an average rate of 80-350 g/Hl/Hr while maintaining an average target temperature of between 97° C. and 99° C. for a period of between 15 minutes and 75 minutes; and during which the wort composition does not reach its boiling point; and (g) transferring the treated wort composition to a trub separation step through the kettle outlet.

In a preferred embodiment, the present invention concerns a process for treating a wort composition in a kettle, said method comprising the steps of:

(a) providing:
a kettle provided with an inlet suitable for feeding a wort composition into the kettle and with an outlet suitable for flowing the wort out of the kettle; heating means;
a gas sparging system suitable for sparging a gas into said wort;

(b) adding wort from a mash separating step into said kettle through the inlet;

(c) heating said wort to a target temperature between 93 and 95.5° C.;

(d) maintaining an average target temperature between 93 and 95.5° C. for a period of 15-20 minutes, and during which the wort composition does not reach its boiling point, and during which period substantially no gas sparging takes place;

(e) raising the temperature of the wort composition to a target temperature of between 97° C. and 99° C.;

(f) sparging a gas through the wort composition at an average rate of 120-220 g/Hl/Hr while maintaining an average target temperature of between 97° C. and 99° C. for a period of between 50 minutes and 70 minutes, and during which the wort composition does not reach its boiling point; and (g) transferring the treated wort composition to a trub separation step through the kettle outlet.

In a further preferred embodiment, the present invention concerns a process for treating a wort composition in a kettle, said method comprising the steps of:

(a) providing:
a kettle provided with an inlet suitable for feeding a wort composition into the kettle and with an outlet suitable for flowing the wort out of the kettle;
heating means;
a gas sparging system suitable for sparging a gas into said wort;

(b) adding wort from a mash separating step into said kettle through the inlet;

(c) heating said wort to a target temperature between 94.5 and 95.5° C.;

(d) maintaining an average target temperature between 94.5 and 95.5° C. for a period of 15-20 minutes, and during which the wort composition does not reach its boiling point, and during which period no gas sparging takes place;

(e) raising the temperature of the wort composition to a target temperature of between 98° C. and 99° C.;

(f) sparging a gas through the wort composition at an average rate of 190-210 g/Hl/Hr while maintaining an average target temperature of between 98° C. and 99° C. for a period of between 55 minutes and 65 minutes and during which the wort composition does not reach its boiling point; and (g) transferring the treated wort composition to a trub separation step through the kettle outlet.

In any of the above processes, step (d) is referred to as the hot hold step. The advantage of this step is that the wort composition undergoes less heat stress and wort damage is minimized at the lower temperature. The reasons for this are twofold: 1) the lower temperature involved reduces the heat stress and wort damage; and 2) the attainment of the target temperature used in steps (e) and (f) is delayed (relative to other prior art processes) allowing a reduced sugar concentration in the kettle, both of which increase shelf-life and flavor stability of the final beverage (i.e., beer).

The hot hold step uses 2 to 3 MJ/hl less energy than the traditional boiling process, such as that employed in EP3066185 (0.56-0.83 KWh/hl for the present invention versus ~0.94 kWh/hl for Example 2 of EP3066185).

The process of the invention also uses less energy required for same conversion of S-methylmethionine (SMM) into dimethylsulfide (DMS) (when combined with subsequent standard brewing processes). Furthermore, less sparge gas is required to remove the DMS as much of this has been generated before the sparging commences. The resultant products exhibit improved shelf life and flavor stability due to lowered temperatures and reduced sugar concentration of the final temperature ramping of step (e).

In any of the above embodiments, preferably the wort composition in step (c) is heated to the target temperature at a rate of between 0.2° C. and 1° C. per minute, preferably between 0.4° C. and 0.75° C. per minute, most preferably about 0.5° C. per minute until target temperature is met.

In any of the above embodiments, once step (d) is completed, preferably the wort composition is heated to the target temperature of step (e) at a rate of between 0.2° C. and 1° C. per minute, preferably between 0.4° C. and 0.75° C. per minute, most preferably about 0.5° C. per minute until target temperature is met.

In any of the above embodiments, the sparged gas is selected from $CO_2$, $N_2$ and air, and combinations thereof, preferably $CO_2$. This is because $CO_2$ is inert and cheap.

Preferably, the byproduct $CO_2$ generated during the fermentation process in the brewery is used as the sparge gas.

A surprising aspect of the present invention is the low levels of combined S-methylmethionine (SMM) into dimethylsulfide (DMS) measured immediately at the end of step (f) of the process of the invention. In this regard, while some prior art processes have relatively low levels of DMS, they do not have low levels of SMM. It is important to have low levels of both. Hence, in a particularly preferred embodiment, the wort composition at the end of step (f) contains less than 150 ppb of combined SMM and DMS, more preferably less than 100 ppb, more preferably less than 75 ppb.

The wort composition exiting step (f) of the process of the invention achieves a DMS (dimethyl sulphide) concentration of less than 150 ppb, more preferably less than 100 ppb, more preferably less than 50 ppb, more preferably less than 20 ppb.

The kettle used in the present invention is preferably heated using a heat exchanger. This may be an external wort boiler (EWB).

Preferably, the variation (min T to max T) of the temperature in step (f) is T±0.75° C., more preferably T±0.5° C.

Preferably, the gas flow in the sparging process of step (f) is uninterrupted. Preferably, any interruption of greater than 10 minutes in the gas sparging process of step (f) should be followed by a continuous gas sparge of not less than 30 minutes. This ensures an adequate removal of volatiles formed during the phase interruption.

Preferably, the sparging process of step (f) is constant and uninterrupted. Preferably, the sparging rate of gas does not vary by more than ±10%, more preferably ±5% of the average gas sparging rate in step (f).

The process of the present invention preferably results in less than 2%, more preferably less than 1.5%, more preferably 0.8-1.2% evaporation of water based on the weight of the initial wort composition. This 2% quantity corresponds to approximately 2 MJ/hl, a reduction of 6 MJ/hl from a base of 4% and 8 MJ/hl from a base of 5% evaporation.

The process of the present invention is essentially a two-step process, the first of wort is the process of flavour formation, i.e., the formation of key flavour-active compounds from precursors via chemical reactions which require heat, agitation and time (and may be influenced by pH), and are also dependent on concentration of relevant species. Step 2 is the process of volatile stripping, i.e., the removal of volatile flavour-active compounds via mass transfer into a vapour phase provided by a carrier gas, which requires heat, agitation and bubbles, with the bubbles providing the surface area for mass transfer of volatiles into the vapour phase.

In a traditional boil process, the 'carrier gas' providing the bubbles of the vapour phase is steam generated through boiling of wort. With the present process, volatile stripping is effected entirely by the gas sparging. As such, the need for boiling is unnecessary, as heat, agitation and time are adequately provided.

The process of the present invention preferably uses a circulation pump.

The process of the present invention preferably requires the process to target a temperature of at least 1° C. below the natural boiling point of the wort composition, at the heater outlet, and preferably no more than a 3° C. difference between this heater outlet temperature and the wort bulk temperature in the kettle. The object is to bring the wort mass up to temperature without boiling the wort and ensure there is not a large temperature differential between the heat outlet and the wort mass. Normally there is heat loss of the mass of 1-2° C. through radiant and loss and gas purging through the wort.

An internal or an external boiler may be used to transfer the heat to the wort. In both cases the wort is preferably pumped through the heat exchanger to ensure a flow rate which will allow heat transfer.

The gas can be sparged into the wort by means of a gas sparger located at or near the bottom of the kettle and oriented upwards or sideways in the radial direction. Said sparger preferably comprises a circular plate, cylinder or ring provided with a multitude of apertures. The apertures can be orifices or open pores of a sintered material, such as sintered stainless steel.

In a particularly preferred embodiment, the kettle houses a plurality of gas spargers which are spaced apart from one another. This allows a homogeneous sparging of the wort composition to take place. This has the advantage of improving the volatilisation of the undesirable volatile compounds such as DMS. Preferably, the kettle houses at least 4 gas spargers, their apertures being at least 30 cm apart from one another, more preferably at least 50 cm apart.

At the end of the process step (f), the treated wort composition can be transferred to a trub separation step, for example in a whirlpool tun, and then to further treatment vessels to produce a beer or a malt based beverage. The beer or malt based beverage thus produced preferably has one or more of the following properties:

(a) Foam stability (NIBEM) of at least 150 s;
(b) Haze measured on fresh beer or malt based beverage lower than 1.0 EBC; and/or
(c) Haze measured on beer or malt based beverage aged for 3 days at 60° C. lower than 1.5 EBC.

Where a circulation pump is used, a forced flow across the calandria heating surfaces is preferably maintained throughout the kettle period, from the start of heat-up until heat supply ceases prior to final checks and cast-out. This is easily achieved with a EWB circulation pump. It can also be achieved where an IWB design (internal wort boiler) already incorporates a suitable circulation pump (e.g. Stromboli kettles). In some IWB cases the existing wort cast-out pump is capable of achieving the required circulation.

It is also important to note that the hottest spot in a kettle operation occurs at the exit of the heating means, such as the calandria, which is not necessarily the same as the temperature in the body of the wort. Therefore, it is possible for a temperature differential to develop between the, e.g., calandria exit and the bulk wort, the extent of which would be influenced by the specific configuration of each kettle, including aspects such as: excess heat input to wort passing through calandria; system heat losses; temperature, specific heat capacity and flowrate of the gas used for sparging; vigour of the boil (and hence rate of heat loss through evaporation).

In a highly preferred embodiment, during step (f), the temperature of the bulk wort is kept within 3° C. (below) the heater outlet temperature.

In some cases, it may not be possible to measure the temperature at the outlet of an internal heater easily, and as such, monitoring of the temperature in the body of the wort is preferably undertaken. The process of the present invention requires very careful maintenance of the various temperatures used in the process. As such, in-line monitoring of the heating (e.g., calandria) outlet is highly preferred.

Further, the potential for a temperature differential between the calandria outlet (as the hottest point in the system) and the body of the wort may be even more dramatic with the present process due to the lower heat input into the system. Hence for the present process, it is highly preferable to measure the kettle body temperature/bulk wort temperature, ideally at the point expected to be the 'coldest' during kettle operation (e.g. furthest point from return of hot wort ex-calandria into kettle).

The kettle may contain several temperature monitoring means. These are preferably spaced apart, such that the temperate of the wort body can be accurately monitored.

BRIEF DESCRIPTION OF THE FIGURES

For a fuller understanding of the nature of the present invention, reference is made to the following detailed description taken in conjunction with the accompanying drawings in which:

FIG. 3: Shows a first embodiment of an internal boiler kettle suitable for the present invention, (a) empty and (b) filled with wort and with gas being sparged therein;
FIG. 4: Shows a second embodiment of an external boiler kettle suitable for the present invention, (a) empty and (b) filled with wort and with gas being sparged therein.

DETAILED DESCRIPTION OF THE INVENTION

Figure 1:
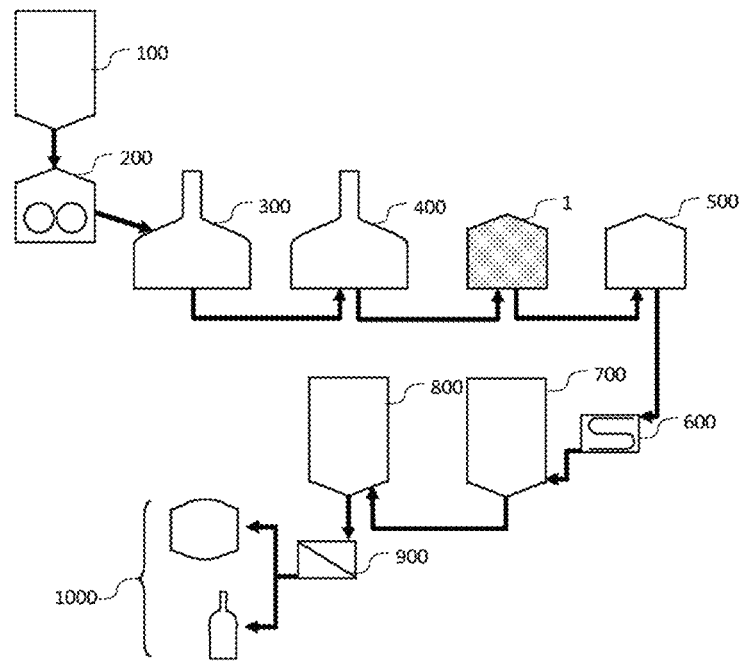
FIG. 1: shows the various steps of a brewing process.

As shown in FIG. 1, the present invention addresses the wort treatment step following lautering (400) and preceding trub separation (500) such as is most often performed in a whirlpool tun. It is clear that a buffer or pre-heating tank can be interposed between a lautering tun and the kettle (1) without changing anything to the present invention. The wort treatment step subject of the present invention is traditionally referred to as a "boiling" step because the wort is traditionally heated above its boiling temperature to sterilize it, terminate enzymatic activity, and convert and/or remove undesired components. In the present process, however, the term "pseudo-boiling" step is used instead because, contrary to the prior art processes, wort is not brought to its boiling temperature at any moment during the treatment time.

The pseudo-boiling process of the present invention is meant to replace advantageously the boiling processes disclosed and used to date in the art, with a concomitant substantial reduction of the energy consumption. In particular, after both a boiling and a pseudo boiling step:

(a) The wort must be sterilized,
(b) the enzymatic activity, must be terminated,
(c) the amount of alpha acids shall be reduced and replaced by iso-alpha-acids,
(d) a substantial amount of S-methylmethionine (SMM) must have been transformed into dimethylsulfide (DMS),
(e) haze active proteins and polyphenols must have been coagulated for separation, and
(f) unwanted flavour compounds, in particular DMS, shall be removed.

The above objectives (a) to (d) are mostly time-temperature dependent and can be achieved at temperatures above 80° C., with a rate increasing with the temperature. Coagulation of proteins and polyphenols and removal of unwanted volatile flavour components, on the other hand, are substantially accelerated when the interfacial area between liquid and gas is increased. For this reason, it is necessary to bring the wort to boiling in order to generate vapour bubbles which substantially increase the liquid-gas interfacial area, and hence the coagulation rate of haze active proteins and polyphenols, and removal rate of undesired volatile components. This method of boiling wort to increase the liquid-gas interfacial area works but has two major inconveniences:

(a) It is strongly energy consuming, and
(b) Water evaporation ranges from 4 wt. % for the most economical boiling systems, to 6-10 wt. % and more for more traditional boiling techniques.

Boiling water is very energy consuming. Wort physical heat properties are very comparable to those of water.

Removal of unwanted volatile flavour compounds such as DMS depends on the vapour-liquid equilibrium (VLE) of each volatile with wort. This means that a determined amount of evaporation is needed to reduce the level of an undesired compound to sub-threshold levels. Therefore a minimum evaporation is always required and most recent systems operate with a minimum of 4-6% evaporation, which is still a considerable amount.

Figure 5:
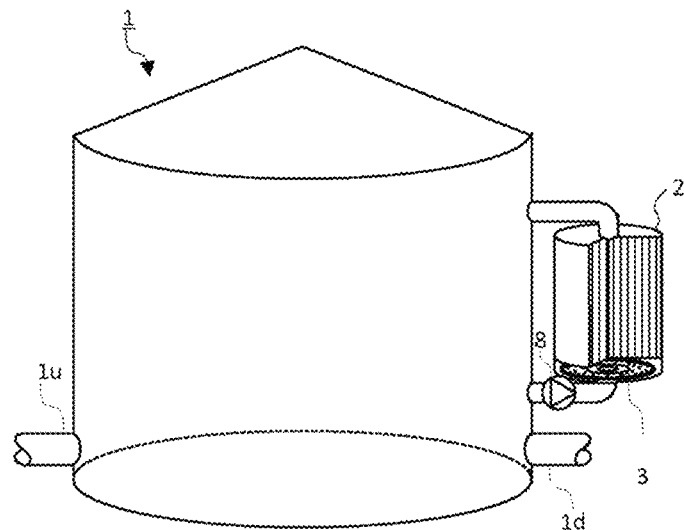
FIG. 5: Shows a third embodiment of an external boiler kettle suitable for the present invention, (a) empty and (b) filled with wort and with gas being sparged therein.
Figure 5:
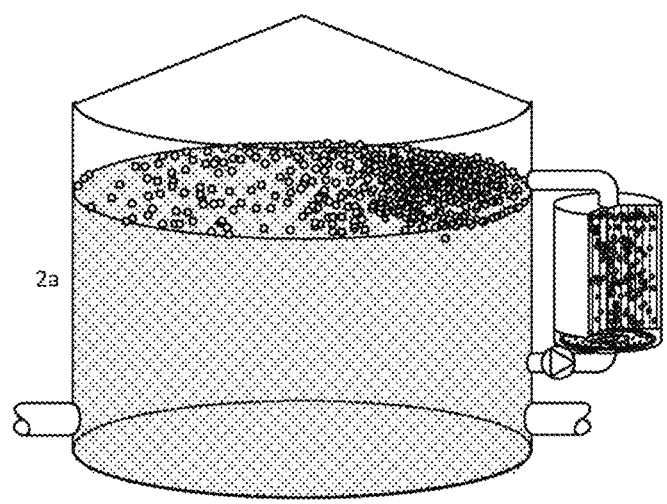
Figure 6:
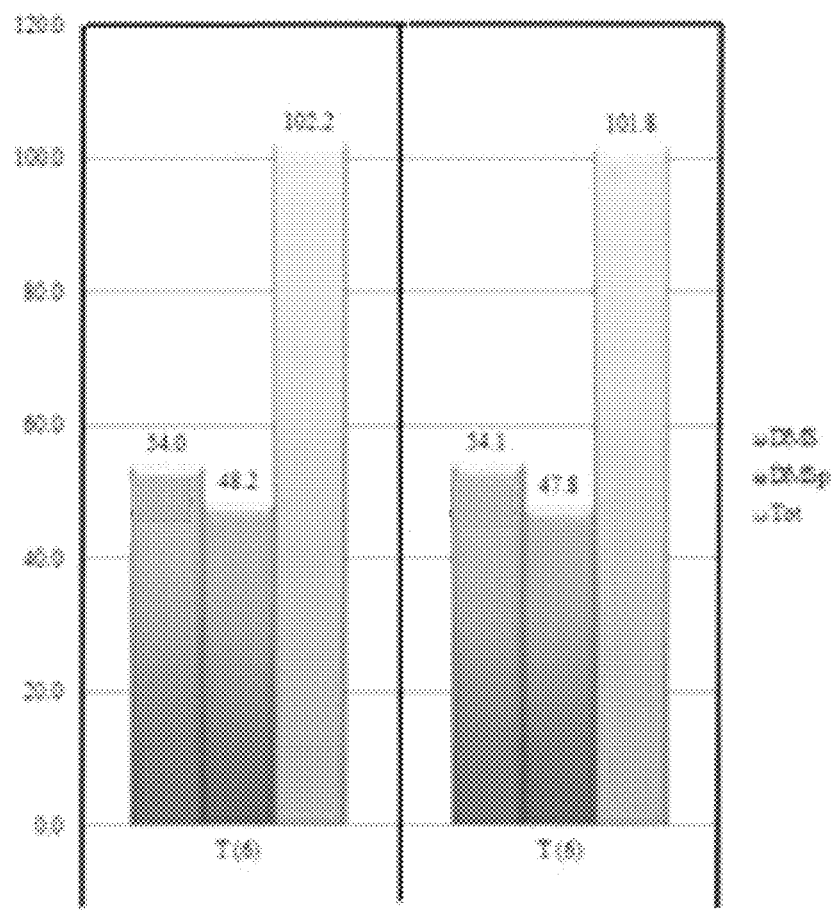
FIG. 6: Shows the combined SMM and DMS content of the process of the present invention.

To carry out a process according to the present invention, a kettle (1) is required, which is provided with an inlet (1*u*) suitable for feeding a wort into the kettle and with an outlet (1*d*) suitable for flowing the wort out of the kettle. Heating means (2) suitable for heating the wort in the kettle must be provided. The heating means are generally in the form of a bundle of parallel jacketed hollow tubes, wherein the wort is circulated through the lumen of the hollow tubes which are heated by a heating fluid circulating in the jackets. The heating means (2) can be located inside the kettle, thus forming an internal boiler kettle as illustrated in FIG. 3(*a*). Due to their very low density these vapour bubbles are the driving force upward through the internal boiler, thereby ensuring a natural convection. In some systems of the prior art, a pump is located below the internal boiler to force wort collected at various points of the kettle to flow through the heating pipes. Though applicable, such forced convection system is not mandatory in the present invention because, as will be discussed below, the sparged gas bubbles create already a forced convection. Alternatively, the heating means (2) can be located outside the kettle, fluidly connected thereto by pipes, thus forming an external boiler kettle as illustrated in FIGS. 4(*a*) and 5(*a*). A pump (8) is usually used to force wort flow through the boiler, Most kettles of the prior art, traditionally used to carry out a wort boiling step fulfill the foregoing requirements, The equipment required for the present invention requires a gas sparging system (3) suitable for sparging an inert gas into said wort. Although known in the art, such as disclosed in EP875560, few boiling kettles are provided with a gas sparging system. A gas sparging system can be very simple; and may include a circular plate, cylinder or ring provided with a multitude of apertures. The apertures can be through channels, like in a shower head, or they may be the pores of an open pore structure, such as a sintered material (e.g., sintered stainless steel). If the inert gas used is nitrogen, a nitrogen converter is very simple and inexpensive to install, and if $CO_2$ is used instead, it is clear that such gas is abundantly available in all breweries. An advantage of the present invention is therefore that it requires no or little modifications to the existing equipment. As shown in FIGS. 3(*b*) and 4(*b*), the gas sparger (3) is preferably located at the bottom of the kettle, so that the gas bubbles may rise to the surface of the wort, fixing on their way up volatiles and haze active proteins. In an alternative embodiment, illustrated in FIG. 5(a) & (b), an external boiler kettle is provided with a gas sparging system located at the upstream end of the external boiler with respect to the wort flow direction (in case of FIG. 5, at the bottom of the boiler). The bubbles are forced through the hollow heating tubes (2a) and injected into the kettle together with the wort. For kettles of the internal boiler type, it is preferred that the sparger be located below the heating tubes (2a) and preferably have a largest dimension (diameter in case of a disc, cylinder, or a ring) which is smaller than the largest diameter of the boiler (2). With such configuration, the gas bubbles rising through the hollow tubes (2a) of the internal boiler create a forced convection driving wort through the lumens of the hollow tubes of the boiler. This is very advantageous because, on the one hand, no immerged pump is required to create such forced convection and, on the other hand, the flowing rate of the wort through the hollow heating tubes during the heating stage is higher and more homogeneous compared with natural convection systems at temperature below, Tb, when insufficient vapour bubbles are present to create a natural convection with the risk of locally overheating wort.

When a kettle provided with an internal boiler (2) is used, a baffle (5) and a deflector-roof (6) are preferably provided on top of the internal boiler in order to channel the flow of rising gas bubbles and wort, redistribute them over the top liquid-air interface of the wort, and reduce the thickness of the foam thus formed to permit better elimination in the air of the volatiles entrained with the bubbles (cf. FIG. 3(b)).

Wort is fed to the kettle from a mash separating step, such as a lautering step (400). In some cases, wort is first passed through a buffer or pre-heating tun prior to entering the kettle. The temperature of the wort is generally below 80° C., After filling the kettle (1) with wort, it is heated to a target temperature of between 94.5 and 95.5° C., and this temperature is maintained for a period of 15 minutes, and during which the wort composition does not reach its boiling point. Preferably, no gas sparging takes place during this phase of the process. After this "holding phase" is carried out, the temperature of the wort composition is increased to a target temperature of between 98° C. and 99° C. When this temperature is reached, a gas is sparged through the wort composition at an average rate of 200 g/Hl/Hr while maintaining an average target temperature of between 98° C. and 99° C. for a period of about 60 minutes; and during which the wort composition does not reach its boiling point. Once this step has been completed, the wort composition is transferred to a trub separation step.

Figure 2:
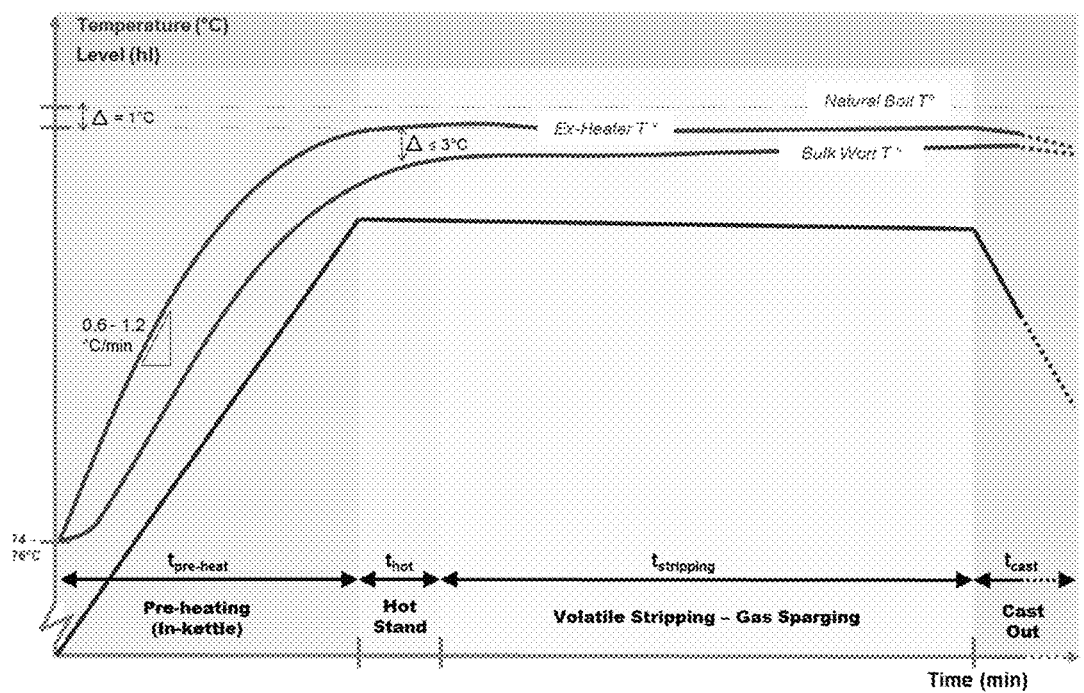
FIG. 2: Schematic of process steps of the present invention.

As illustrated in FIG. 2, this shows an embodiment illustrating the process of a preferred embodiment the present invention. In the first "pre-heating" phase, the temperature is raised at a rate of 0.6 to 1.2° C./min until the temperature reaches about 3° C. below the natural boiling temperature of the wort. The wort composition is then enters the "hot stand" phase, where the temperature is maintained at this temperature. The temperature is then raised again to about 1.5° C. below the natural boiling temperature of the wort, and is held there for a period of time during which the composition is sparged with an inert gas. The volatile materials, such as SMM and DMS are stripped from the composition during this part of the process.

During all of these process steps, the exit temperature of the external heater is kept above that of the wort body composition. This is because some of the heat is lost to the process (radiation, sparging, etc.).

As shown in FIGS. 3(b) and 4(b), an inert gas sparger located at the bottom of the kettle generates a column of gas bubbles. The volatile components present in the wort are thus in equilibrium between gas and liquid phases without need for the wort to boil. As discussed above, the column of bubbles penetrating through the lumens of the hollow tubes of an internal boiler as depicted in FIG. 3(b), creates a forced convection independent of temperature, contrary to natural convection which is highly temperature dependent for the creation of sufficient vapour bubbles. On the other hand, inert gas bubbles act like vapour bubbles when surfacing, yielding the same effect as with the latter with respect to elimination of volatiles and coagulation of haze active proteins, but without having to boil and evaporate large amounts of wort. The gas flow is also advantageous because it homogenizes the wort by creating a gas lift system with a central ascending flow and a lateral descending flow, as illustrated by the black arrows in FIGS. 3(b) and 4(b).

After the pseudo-boiling process of the present invention, wort can be fed to a whirlpool tun or the like for separating trub from clear wort, and thence proceed to fermentation (700), maturation (800), filtering (900) and packaging (1000) of the thus produced beer exactly in the same way as in the conventional brewing processes.

What is claimed is:

1. A process for treating a wort composition in a kettle, the process comprising the steps of:
   (a) providing:
      a kettle provided with an inlet suitable for feeding a wort composition into the kettle and with an outlet suitable for flowing the wort composition out of the kettle;
      heating means; and
      a gas sparging system suitable for sparging a gas into the wort composition;
   (b) adding the wort composition from a mash separating step into the kettle through the inlet;
   (c) heating the wort composition to a target temperature between 80° C. and 96° C.;
   (d) maintaining an average target temperature of the wort composition between 80° C. and 96° C. for a first period of 12-45 minutes, wherein during the first period the wort composition does not reach its boiling point, and wherein during the first period a gas sparging of less than 10 g/Hl/Hr takes place;
   (e) raising the target temperature of the wort composition to a second target temperature of between 97° C. and 99° C.;
   (f) sparging a gas through the wort composition at an average rate of 80-350 g/Hl/Hr while maintaining a second average target temperature of between 97° C. and 99° C. for a second period of between 15 minutes and 75 minutes, wherein during the second period the wort composition does not reach its boiling point; and
   (g) transferring the wort composition as a treated wort composition to a trub separation step through the outlet of the kettle.

2. The process of claim 1, wherein, in process step (c), the target temperature is between 93° C. and 95.5° C.

3. The process of claim 1, wherein, in process step (d), the average target temperature is between 93° C. and 95.5° C.

4. The process of claim 1, wherein, in process step (d) is carried out for a period of , the first period is 15-20 minutes.

5. The process according toof claim 1, wherein, in the process step (d), no gas sparging takes place.

6. The process of claim 1, wherein, in process step (e) the second target temperature is between 98° C. and 99° C.

7. The process of claim 1, wherein, in process step (f), the average rate at which the gas is sparged through the wort composition is 120-220 g/Hl/Hr.

8. The process of claim 1, wherein, in process step (f), the second period is between 55 minutes and 65 minutes.

9. The process of claim 1, wherein, in process step (c), the wort composition is heated to the target temperature at a rate of between 0.2° C. and 1° C. per minute until the target temperature is met.

10. The process of claim 1, wherein once process step (d) is completed, the wort composition is heated to the second target temperature of process step (e) at a rate of between 0.4° C. and 0.75° C. per minute until the second target temperature is met.

11. The process of claim 1, wherein the gas is selected from at least one of $CO_2$, $N_2$, air, and combinations thereof.

12. The process of claim 1, wherein the wort composition exiting process step (f) contains less than 150 ppb of combined S-methylmethionine (SMM) and dimethylsulfide (DMS).

13. The process of claim 1, wherein the wort composition exiting process step (f) of the process achieves a dimethylsulfide (DMS) concentration of less than 20 ppb.

14. The process of claim 1, wherein process steps (a) to (f) result in less than 2% evaporation of water based on a weight of the wort composition prior to treating.

15. The process of claim 1, wherein process steps (a) to (f) result in 0.8% to 1.2% evaporation of water based on a weight of the wort composition prior to adding the wort composition into the kettle.

16. The process of claim 1, wherein the wort composition exiting process step (f) contains less than 100 ppb of combined S-methylmethionine (SMM) and dimethylsulfide (DMS).

17. The process of claim 1, wherein the wort composition exiting process step (f) contains less than 75 ppb of combined S-methylmethionine (SMM) and dimethylsulfide (DMS).

18. The process of claim 1, wherein, in process step (f), the average rate at which the gas is sparged through the wort composition is 190-210 g/HUHr.

19. A method for treating a wort composition in a kettle, the method comprising:
providing:
a kettle comprising an inlet that feeds a wort composition into the kettle and an outlet that flows the wort composition out of the kettle;
a heater; and
a gas sparging system that sparges a gas into the wort composition;
adding the wort composition from a mash separation into the kettle through the inlet;
heating, by the heater, the wort composition to a first target temperature between 80° C. and 96° C.;
maintaining a first average target temperature of the wort composition between 80° C. and 96° C. for a first period between 12 minutes and 45 minutes, wherein during the first period the wort composition does not reach its boiling point, and wherein during the first period no gas sparging of the wort composition takes place;
heating, by the heater, the wort composition to a second target temperature of between 97° C. and 99° C.;
sparging, by the gas sparging system, a gas through the wort composition at an average rate of 80-350 g/Hl/Hr while maintaining a second average target temperature of the wort composition between 97° C. and 99° C. for a second period of between 15 minutes and 75 minutes; and wherein during the second period the wort composition does not reach its boiling point; and
transferring the wort composition as a treated wort composition out of the kettle through the outlet.

20. A method, comprising:
adding a wort composition into a kettle through an inlet of the kettle, the wort composition comprising an initial total weight;
heating, by a heater of the kettle, the wort composition to a first target temperature between 80° C. and 96° C.;
maintaining a first average target temperature of the wort composition between 80° C. and 96° C. for a first period between 12 minutes and 45 minutes, wherein during the first period the wort composition does not reach its boiling point, and wherein during the first period no gas sparging of the wort composition takes place;
heating, by the heater of the kettle, the wort composition to a second target temperature of between 97° C. and 99° C.;
sparging a gas through the wort composition at an average rate of 80-350 g/Hl/Hr while maintaining a second average target temperature of the wort composition between 97° C. and 99° C. for a second period of between 15 minutes and 75 minutes; and wherein during the second period the wort composition does not reach its boiling point; and
transferring the wort composition as a treated wort composition out of the kettle through an outlet of the kettle, wherein the treated wort composition comprises 0.8% to 1.2% evaporation of water based on the initial total weight of the wort composition.

\* \* \* \* \*

UNITED STATES PATENT AND TRADEMARK OFFICE
CERTIFICATE OF CORRECTION

| | | |
|---|---|---|
| PATENT NO. | : 11,788,037 B2 | Page 1 of 1 |
| APPLICATION NO. | : 16/460039 | |
| DATED | : October 17, 2023 | |
| INVENTOR(S) | : Robert Taylor, II et al. | |

It is certified that error appears in the above-identified patent and that said Letters Patent is hereby corrected as shown below:

In the Specification

Column 7, Line 9, delete "temperate" and insert --temperature--;

In the Claims

Claim 4, Column 10, Lines 62-63, delete "is carried out for a period of " should be deleted;

Claim 5, Column 10, Line 64, delete "according toof" and insert --of--

Claim 5, Column 10, Line 64, delete the second use of "the" at the end of the line;

Claim 18, Column 11, Line 42, delete "g/HUHr" and insert --g/Hl/Hr--.

Signed and Sealed this
Twelfth Day of December, 2023

*Katherine Kelly Vidal*

Katherine Kelly Vidal
*Director of the United States Patent and Trademark Office*